(12) United States Patent
Tam et al.

(10) Patent No.: US 9,731,454 B2
(45) Date of Patent: Aug. 15, 2017

(54) MULTIDIRECTIONAL FIBER-REINFORCED TAPE/FILM ARTICLES AND THE METHOD OF MAKING THE SAME

(71) Applicant: HONEYWELL INTERNATIONAL INC., Morristown, NJ (US)

(72) Inventors: Thomas Tam, Chesterfield, VA (US); Mark Benjamin Boone, Midlothian, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 371 days.

(21) Appl. No.: 14/503,936

(22) Filed: Oct. 1, 2014

(65) Prior Publication Data
US 2016/0368227 A1    Dec. 22, 2016

Related U.S. Application Data

(60) Division of application No. 13/568,097, filed on Aug. 6, 2012, now Pat. No. 8,852,714, which is a continuation-in-part of application No. 12/539,185, filed on Aug. 11, 2009, now Pat. No. 8,236,119.

(51) Int. Cl.
| | |
|---|---|
| *B29C 65/00* | (2006.01) |
| *B29C 70/34* | (2006.01) |
| *D03D 1/00* | (2006.01) |
| *D02G 3/36* | (2006.01) |
| *D02G 3/22* | (2006.01) |
| *B32B 5/12* | (2006.01) |
| *B29C 55/06* | (2006.01) |
| *B29C 43/22* | (2006.01) |
| *F41H 5/04* | (2006.01) |
| *B29K 23/00* | (2006.01) |

(52) U.S. Cl.
CPC ............. *B29C 70/34* (2013.01); *B29C 43/22* (2013.01); *B29C 55/065* (2013.01); *B32B 5/12* (2013.01); *D02G 3/22* (2013.01); *D02G 3/36* (2013.01); *D03D 1/00* (2013.01); *F41H 5/0485* (2013.01); *B29K 2023/0683* (2013.01); *B29K 2995/0089* (2013.01); *B32B 2262/0253* (2013.01); *B32B 2571/02* (2013.01)

(58) Field of Classification Search
CPC .................................. B32B 5/12; B32B 5/02
USPC ................. 428/113, 98, 105, 156, 213, 364; 442/135
See application file for complete search history.

(56) References Cited

U.S. PATENT DOCUMENTS

| | | | |
|---|---|---|---|
| 5,578,373 | A | 11/1996 | Kobayashi et al. |
| 5,579,628 | A | 12/1996 | Dunbar et al. |
| 5,628,946 | A | 5/1997 | Ward et al. |
| 5,901,632 | A | 5/1999 | Ryan |

(Continued)

FOREIGN PATENT DOCUMENTS

| | | |
|---|---|---|
| CN | 1400342 | 3/2003 |
| CN | 1995496 | 7/2007 |

(Continued)

*Primary Examiner* — Brent O'Hern
(74) *Attorney, Agent, or Firm* — Roberts & Roberts, LLP; Richard S. Roberts, Jr.

(57) ABSTRACT

High tenacity, high elongation multi-filament polymeric tapes as well as ballistic resistant fabrics, composites and articles made therefrom. The tapes are fabricated from multi-filament fibers/yarns that are twisted together, bonded together, compressed and flattened.

17 Claims, 9 Drawing Sheets

(56) References Cited

U.S. PATENT DOCUMENTS

| | | |
|---|---|---|
| 6,277,773 B1 | 8/2001 | Ward et al. |
| 6,951,685 B1 | 10/2005 | Weedon et al. |
| 7,370,395 B2 | 5/2008 | Tam |
| 8,022,171 B2 | 9/2011 | Goossens et al. |
| 2002/0037391 A1 | 3/2002 | Harpell et al. |
| 2003/0082381 A1 | 5/2003 | Nakanishi |
| 2004/0267316 A1 | 12/2004 | Powell et al. |
| 2006/0051564 A1 | 3/2006 | Jacobs et al. |
| 2009/0280708 A1 | 11/2009 | Marissen et al. |
| 2010/0003452 A1 | 1/2010 | Jongedijk et al. |
| 2012/0121852 A1 | 5/2012 | Tam et al. |
| 2012/0258301 A1* | 10/2012 | Tam .................. B29C 43/22 428/220 |

FOREIGN PATENT DOCUMENTS

| | | |
|---|---|---|
| EP | 0277750 | 8/1988 |
| EP | 0483780 A2 | 5/1992 |
| EP | 1627719 | 2/2006 |
| EP | 2014445 | 1/2009 |
| GB | 2164897 | 4/1986 |
| JP | S6097835 | 5/1985 |
| JP | S60141537 | 7/1985 |
| JP | 05-214657 | 8/1993 |
| JP | 2008526406 | 7/2008 |
| WO | 2006074823 | 7/2006 |
| WO | 2009056286 | 5/2009 |
| WO | 2009077168 | 6/2009 |

* cited by examiner

MULTIDIRECTIONAL FIBER-REINFORCED TAPE/FILM ARTICLES AND THE METHOD OF MAKING THE SAME

CROSS-REFERENCE TO RELATED APPLICATION

This application is a Division of co-pending application Ser. No. 13/568,097, filed on Aug. 6, 2012, now U.S. Pat. No. 8,852,714, which is a Continuation-in-Part of application Ser. No. 12/539,185, filed on Aug. 11, 2009, now U.S. Pat. No. 8,236,119, the entire disclosures of which are incorporated by reference herein.

FIELD OF THE INVENTION

The invention relates to high tenacity, high elongation multi-filament polymeric tapes as well as ballistic resistant fabrics, composites and articles made therefrom.

DESCRIPTION OF THE RELATED ART

High performance thermoplastic fibers/yarns, such as SPECTRA® polyethylene fibers/yarns or aramid fibers/yarns such as KEVLAR® and TWARON®, are known to be useful for the formation of articles having excellent ballistic resistance. Articles such as bullet resistant vests, helmets, vehicle panels and structural members of military equipment are typically made from fabrics comprising high strength fibers/yarns because of their very high strength to weight performance. For many applications, the fibers/yarns may be formed into woven or knitted fabrics. For other applications, the fibers/yarns may be encapsulated or embedded in a polymeric matrix material and formed into non-woven fabrics. In one common non-woven fabric structure, a plurality of unidirectionally oriented fibers/yarns are arranged in a generally co-planar relationship and coated with a matrix material to bind the fibers/yarns together. Typically, multiple plies of such unidirectionally oriented fibers/yarns are merged into a multi-ply composite. See, for example, U.S. Pat. Nos. 4,403,012; 4,457,985; 4,613,535; 4,623,574; 4,650,710; 4,737,402; 4,748,064; 5,552,208; 5,587,230; 6,642,159; 6,841,492; and 6,846,758, all of which are incorporated herein by reference to the extent consistent herewith, which describe ballistic resistant composites including multiple plies of non-woven fiber/yarn plies.

Composites fabricated from non-woven fabrics are known to stop projectiles better than woven fabric composites because the component fibers/yarns in non-woven fabrics are not crimped like the fibers/yarns in woven materials. Fiber/yarn crimping reduces the ability of the fibers/yarns to stay in tension and immediately absorb the energy of a projectile, compromising their effectiveness. In addition, projectile damage to non-woven fabrics is more localized compared to woven fabrics, allowing for enhanced multi-hit performance. However, non-woven composite technology remains imperfect. For example, traditional non-woven composites are not ideal because a resin coating is generally necessary to keep the component fibers/yarns bound together. This resin is present in place of a greater quantity of high strength fibers/yarns, and the reduction in overall fiber/yarn content reduces the maximum achievable ballistic resistance efficiency on an equal weight basis relative to fabrics incorporating no resin coating. In addition, traditional multi-ply non-woven fabrics are formed by cross-plying adjacent plies at 0°/90° angles, as this construction has been found to achieve greater ballistic penetration resistance than other constructions. However, the 0°/90° plies are subject to delamination when the fabric is molded into different contours, such as in the fabrication of helmets and other curved articles. This reduces their versatility. Accordingly, there is a long felt need in the art for non-woven composites having improved ballistic performance and versatility.

In this regard, it was recently described in co-pending application Ser. No. 12/539,185, which is incorporated herein by reference, that the ballistic-resistance efficiency of a composite may be improved by using resin coated strips or ribbons as the component elements of a non-woven composite rather than resin coated multi-filament yarns. As described in Ser. No. 12/539,185, this was first recognized in U.S. Pat. No. 4,623,574 which compared the ballistic resistance effectiveness of a composite comprising ultra-high molecular weight polyethylene ("UHMW PE") ribbons having a relatively flat, rectangular cross-section (i.e. an aspect ratio of at least about 5) versus a composite formed from UHMW PE multi-filament yarns having a more conventional rounded cross-section. Surprisingly, it was found that the multi-filament yarn had a higher tenacity than the ribbon, i.e. 30 grams/denier versus 23.6 grams/denier, and the Specific Energy Absorption (SEA) value of the composite constructed with the ribbon was higher than the SEA of the composite constructed with the yarn. Other publications disclosing the formation of articles from flat ribbons or tapes are U.S. Pat. Nos. 4,413,110; 4,996,011; 5,002,714; 5,091,133; 5,106,555, 5,200,129; 5,578,373; 5,628,946; 6,017,834; 6,328,923; 6,458,727; 6,951,685; 7,279,441; 7,470,459; 7,740,779; and 7,976,930, as well as U.S. patent application publication 2010/0260968.

These publications teach various methods of forming flat fibrous structures. In one method, polyethylene filaments are subjected to a contact pressure at an elevated temperature to selectively melt a portion of the filaments and bind them together, followed by compression of the bound filaments to form a tape. In another method, a polyethylene powder is compressed at an elevated temperature to bond the powder particles into a continuous sheet that is further compressed and stretched. Polyethylene tapes so produced are commercially available under the trademark TENSYLON®, which is now available from E. I. du Pont de Nemours and Company of Wilmington, Del., which are described in U.S. Pat. No. 5,091,133. The highest reported ultimate tensile strength (UTS) for such TENSYLON® tapes is 19.5 g/d (1.67 GPa) with an ultimate elongation percentage (UE %) of 1.9%. Polyethylene tapes commercially available from Royal DSM N.V. of The Netherlands as described in their U.S. patent application publication no. 2008/0156345 have a reported UTS of 36.7 cn/dtex (41.58 g/denier) and a reported UE % of 3.2%. Polyethylene tapes commercially available from Teijin Fibers Ltd. of Japan under the trademark ENDUMAX® have a reported UTS ranging from 22-28.6 g/denier and a reported UE % ranging from 1.5% to 2%.

While the TENSYLON®, DYNEEMA® and ENDUMAX® polymeric tapes have represented advancements in the state of the art, there is a need for polymeric tapes having improved ultimate elongation at high ultimate tensile strengths (UTS). High UE % is desired because greater UE % translates to greater energy absorption, and greater energy absorption translates to improved ballistic resistance. However, while there are constant efforts in the art to produce materials having greater UTS, increases in UTS are naturally met with a decrease in UE %. Accordingly, a need for improvements remains ongoing. The present invention provides solutions to this need.

SUMMARY OF THE INVENTION

The invention provides a polymeric tape comprising a flattened multi-filament yarn, said yarn comprising a plurality of continuous polymeric filaments that are twisted together and bonded together; wherein said tape has an ultimate tensile strength of at least 15 g/denier and wherein the value of the ultimate tensile strength (g/denier) of the tape multiplied by the ultimate elongation (%) of the tape (UTS*UE) is at least 150.

The invention also provides a polymeric tape comprising a flattened multi-filament yarn, said yarn comprising a plurality of continuous polymeric filaments that are twisted together and bonded together; wherein said tape has an ultimate elongation (y) (%) and an ultimate tensile strength (x)(g/denier) that are proportional to each other and conform to the relationship y=−0.04x+b, where b=5 or greater and x is 15 or greater.

The invention further provides a process for forming a layer comprising a plurality of polymeric tapes, the method comprising:

a) providing a plurality of polymeric tapes, each polymeric tape comprising a flattened multi-filament yarn, said yarn comprising a plurality of continuous polymeric filaments that are twisted together and bonded together with at least about 3 twists per inch of yarn length and less than about 15 twists per inch of yarn length, wherein the polymeric tape has an average cross-sectional aspect ratio of at least about 10:1;

b) arranging said plurality of polymeric tapes into a side-by-side planar array such that only their edges are in contact with each other;

c) optionally applying a polymeric binder material onto said array of tapes; and d) applying heat and/or pressure to said array of tapes under conditions sufficient to consolidate said array of tapes into a substantially planar, unitary layer.

Also provided are fabrics, composites and articles formed from such polymeric tapes.

Figure 1:
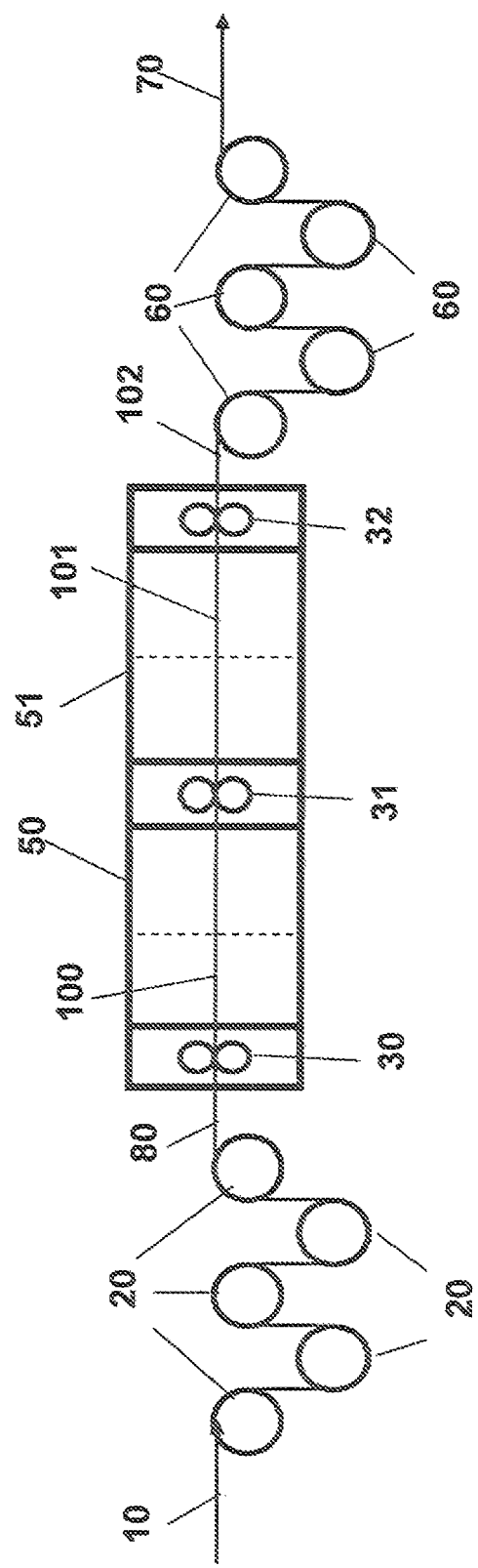
FIG. 1 is a schematic representation of a first apparatus for producing polymeric tapes, illustrating a sequence of compression-stretching-compression-stretching-compression.

In each of FIGS. 1-7 only one yarn end is shown for clarity, but several yarn ends may be simultaneously treated in parallel by a process of the invention to produce several polymeric tapes, or a single wide polymeric tape.

DETAILED DESCRIPTION OF THE INVENTION

As used herein, the term "tape" refers to a narrow strip of fibrous material having a length greater than its width, wherein a "fibrous material" comprises one or more filaments. The cross-section of a polymeric tape of the invention may be rectangular, oval, polygonal, irregular, or of any shape satisfying the width, thickness and aspect ratio requirements outlined herein. Preferably, the tapes are flat structures having a substantially rectangular cross-section with a thickness of about 0.5 mm or less, more preferably about 0.25 mm or less, still more preferably about 0.1 mm or less and still more preferably about 0.01 mm or less. In the most preferred embodiments, the polymeric tapes have a thickness of up to about 3 mils (76.2 μm), more preferably from about 0.35 mil (8.89 μm) to about 3 mils (76.2 μm), and most preferably from about 0.35 mil to about 1.5 mils (38.1 μm). Thickness is measured at the thickest region of the cross-section.

The polymeric tapes of the invention have widths of about 100 cm or less, more preferably about 50 cm or less and still more preferably about 25 cm or less. A tape typically has a width less than or equal to about 6 inches (15.24 cm), with a preferred width of from about 5 mm to about 50 mm, more preferably from about 5 mm to about 25.4 mm (1 inch), even more preferably from about 5 mm to about 20 mm, and most preferably from about 5 mm to about 10 mm.

These dimensions may vary but the polymeric tapes formed herein are most preferably fabricated to have dimensions that achieve an average cross-sectional aspect ratio, i.e. the ratio of the greatest to the smallest dimension of cross-sections averaged over the length of the tape article, of greater than about 10:1. More preferably, a polymeric tape of the invention has an average cross-sectional aspect ratio of at least about 20:1, more preferably at least about 50:1, still more preferably at least about 100:1, still more preferably at least about 250:1 and most preferably at least about 400:1.

Each tape is formed from a plurality of multi-filament yarns wherein each yarn includes from 2 to about 1000 filaments, more preferably from 30 to 500 filaments, still more preferably from 100 to 500 filaments, still more preferably from about 100 filaments to about 250 filaments and most preferably from about 120 to about 240 filaments. Multifilament fibers are also often referred to in the art as bundles of fibers.

Similar to a tape, a "fiber," a "filament" and a "yarn" as defined herein are each defined as an elongate body the length dimension of which is much greater than the transverse dimensions of width and thickness. The cross-sections of fibers, filaments and yarns may vary and may be regular or irregular, including circular, flat or oblong cross-sections, with substantially circular cross-sections being most preferred. Fibers and yarns are distinguished from filaments in that fibers and yarns are formed from filaments. A fiber may be formed from just one filament or from multiple filaments. A fiber formed from just one filament is referred to either as a "single-filament" fiber or a "monofilament" fiber, and a fiber formed from a plurality of filaments is referred to as a "multi-filament" fiber. However, a "yarn" is defined as a single strand consisting of multiple filaments, analogous to a multi-filament fiber. Such a multi-filament strand is referred to herein as a "fiber/yarn".

The processes described herein convert high strength feed fibers/yarns, i.e. fibers/yarns having high ultimate tensile strength (high UTS (high tenacity)) and corresponding low ultimate elongation (UE %), into polymeric tapes having high UTS and comparatively higher UE % by compressing, consolidating, and flattening the twisted feed fiber/yarn, thereby forming a polymeric tape with substantial retention of fiber/yarn tensile strength. The use of a twisted feed fiber/yarn results in a tape composed of filaments that are not predominately parallel to the centerline of the tape, with the angle between the filaments and the tape centerline being determined partly by the amount of twist in the feed fiber/yarn, and partly by the tape forming process conditions. It has been discovered that increasing the angle between the filaments and the tape centerline is a useful way of increasing the ultimate elongation of the tape, without significantly reducing the ultimate tensile strength of the tape.

In this regard, the high strength fibers/yarns used as feeds for forming the polymeric tapes herein are preferably fibers/yarns that are suitable for the manufacture of ballistic resistant composites/fabrics. As used herein, a "high strength" fiber/yarn is one which has a preferred tenacity of at least about 7 g/denier or more, a preferred tensile modulus of at least about 150 g/denier or more, a preferred an energy-to-break of at least about 8 J/g or more, each as measured by ASTM D2256. As used herein, the term "denier" refers to the unit of linear density, equal to the mass in grams per 9000 meters of fiber/yarn. As used herein, the term "tenacity" refers to the tensile stress expressed as force (grams) per unit linear density (denier) of an unstressed specimen. The "initial modulus" of a fiber/yarn is the property of a material representative of its resistance to deformation. The term "tensile modulus" refers to the ratio of the change in tenacity, expressed in grams-force per denier (g/d) to the change in strain, expressed as a fraction of the original fiber/yarn length (in/in).

The feed fibers/yarns may be of any suitable denier. For example, the feed fibers/yarns may have a denier of from about 50 to about 3000 denier, more preferably from about 200 to 3000 denier, still more preferably from about 1000 to 3000 denier. In another preferred embodiment, the feed fibers/yarns have a denier of from about 650 to about 2000 denier, more preferably from 800 to 2000 denier, and most preferably from about 800 to about 1500 denier. The selection is governed by considerations of ballistic effectiveness and cost. Finer fibers/yarns are more costly to manufacture and to weave, but can produce greater ballistic effectiveness per unit weight.

Preferred fibers/yarns have a preferred tenacity of about 15 g/denier or more, more preferably about 20 g/denier or more, still more preferably about 25 g/denier or more, still more preferably about 30 g/denier or more, still more preferably about 40 g/denier or more, still more preferably about 45 g/denier or more, and most preferably about 50 g/denier or more. Preferred fibers/yarns also have a preferred tensile modulus of about 300 g/denier or more, more preferably about 400 g/denier or more, more preferably about 500 g/denier or more, more preferably about 1,000 g/denier or more and most preferably about 1,500 g/denier or more. Preferred fibers/yarns also have a preferred energy-to-break of about 15 J/g or more, more preferably about 25 J/g or more, more preferably about 30 J/g or more and most preferably have an energy-to-break of about 40 J/g or more. Methods of forming each of the preferred feed fiber/yarn types having these combined high strength properties are conventionally known in the art.

High tensile strength, high tensile modulus fiber/yarn polymer types that are particularly suitable herein include polyolefin fibers/yarns, including high density and low density polyethylene. Particularly preferred are extended chain polyolefin fibers, such as highly oriented, high molecular weight polyethylene fibers/yarns, particularly ultra-high molecular weight polyethylene fibers/yarns, and polypropylene fibers/yarns, particularly ultra-high molecular weight polypropylene fibers/yarns. Also suitable are aramid fibers/yarns, particularly para-aramid fibers/yarns, polyamide fibers/yarns, polyethylene terephthalate fibers/yarns, polyethylene naphthalate fibers/yarns, extended chain polyvinyl alcohol fibers/yarns, extended chain polyacrylonitrile fibers/yarns, polybenzoxazole (PBO) fibers/yarns, polybenzothiazole (PBT) fibers/yarns, liquid crystal copolyester fibers/yarns, glass fibers/yarns, and rigid rod fibers/yarns such as M5® fibers/yarns. M5® fibers/yarns are formed from pyridobisimidazole-2,6-diyl (2,5-dihydroxy-p-phenylene) and are manufactured by Magellan Systems International of Richmond, Va. and are described, for example, in U.S. Pat. Nos. 5,674,969, 5,939,553, 5,945,537, and 6,040,478, each of which is incorporated herein by reference. Each of these fiber/yarn types described above is conventionally known in the art. Also suitable for producing polymeric fibers/yarns are copolymers, block polymers and blends of the above materials. For example, the inventive polymeric tapes may be formed from multi-filament fibers/yarns comprising at least two different filament types, such as two different types of UHMW PE filaments or a blend of aramid and UHMW PE filaments.

Of these, the most preferred fiber/yarn types include polyethylene, particularly extended chain polyethylene fibers/yarns, aramid fibers/yarns, PBO fibers/yarns, liquid crystal copolyester fibers/yarns, polypropylene fibers/yarns, particularly highly oriented extended chain polypropylene fibers/yarns, polyvinyl alcohol fibers/yarns, polyacrylonitrile fibers/yarns and rigid rod fibers/yarns, particularly M5® fibers/yarns.

Specifically most preferred fibers/yarns are ultra high molecular weight polyethylene (UHMW PE) fibers/yarns. Ultra high molecular weight polyethylene fibers/yarns are formed from extended chain polyethylenes having molecular weights of at least 300,000, preferably at least one million and more preferably between two million and five million. Such extended chain polyethylene fibers/yarns may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber/yarn types are any of the polyethylene fibers/yarns sold under the trademark SPECTRA® from Honeywell International Inc, including SPECTRA® 900 fibers/yarns, SPECTRA® 1000 fibers/yarns and SPEC- TRA® 3000 fibers/yarns, all of which are commercially available from Honeywell International Inc. of Morristown, N.J.

The most preferred UHMW PE fibers/yarns selected as a feed for a process of this invention have an intrinsic viscosity when measured in decalin at 135° C. by ASTM D1601-99 of from about 7 dl/g to about 40 dl/g, preferably from about 10 dl/g to about 40 dl/g, more preferably from about 12 dl/g to about 40 dl/g, and most preferably, from about 14 dl/g to 35 dl/g. The most preferred UHMW PE fibers/yarns selected as a feed for a process of this invention are highly oriented and have a c-axis orientation function of at least about 0.96, preferably at least about 0.97, more preferably at least about 0.98 and most preferably at least about 0.99. The c-axis orientation function is a description of the degree of alignment of the molecular chain direction with the filament direction. A polyethylene filament in which the molecular chain direction is perfectly aligned with the filament axis would have an orientation function of 1. C-axis orientation function ($f_c$) is measured by the wide angle x-ray diffraction method described in Correale, S. T. & Murthy, Journal of Applied Polymer Science, Vol. 101, 447-454 (2006) as applied to polyethylene.

The most preferred UHMW PE fibers/yarns selected as a feed for a process of this invention have a tenacity from about 15 g/d to about 100 g/d, preferably from about 25 g/d to about 100 g/d, more preferably from about 30 g/d to about 100 g/d, yet more preferably from about 35 g/d to about 100 g/d, still more preferably from about 40 g/d to about 100 g/d and most preferably, from about 45 g/d to about 100 g/d.

It is a particular objective of the invention that the polymeric tapes produced according to a process of the invention have a higher ultimate elongation at high UTS relative to other high UTS tapes. It is generally known that increases in fiber/yarn UTS are naturally met with a decrease in fiber/yarn UE %. In order to achieve a tape with a higher UE %, it is necessary that the feed fibers/yarns are first twisted prior to being compressed and flattened into a tape.

Various methods of twisting fibers/yarn are known in the art, and any method may be utilized. Useful twisting methods are described, for example, in U.S. Pat. Nos. 2,961,010; 3,434,275; 4,123,893; 4,819,458 and 7,127,879, the disclosures of which are incorporated herein by reference. The fibers/yarns are twisted to have at least about 0.5 turns of twist per inch of fiber/yarn length up to about 15 twists per inch, more preferably from about 3 twists per inch to about 11 twists per inch of fiber/yarn length. In an alternate preferred embodiment, the fibers/yarns are twisted to have at least 11 twists per inch of fiber/yarn length, more preferably from about 11 twists per inch to about 15 twists per inch of fiber/yarn length. The standard method for determining twist in twisted yarns is ASTM D1423-02. Optionally, the feed fiber/yarn may be heat set by a process described in U.S. Pat. No. 4,819,458.

After twisting, the filaments of the twisted feed fiber/yarn may optionally be at least partially connected by fusion or by bonding. Fusion of the fiber/yarn filaments may be accomplished by various means, including the use of heat and tension, or through application of a solvent or plasticizing material prior to exposure to heat and tension as described in U.S. Pat. Nos. 5,540,990; 5,749,214; and 6,148,597, which are hereby incorporated by reference to the extent compatible herewith. Bonding may be accomplished, for example, by at least partially coating the filaments with a resin or other polymeric binder material having adhesive properties, such as a polystyrene-polyisoprene-polystyrene-block copolymer resin commercially available from Kraton Polymers of Houston, Tex. under the trademark KRATON® D1107. They may also be thermally bonded together without an adhesive coating. Thermal bonding conditions will depend on the fiber type. When the feed fibers/yarns are coated with a resin or other polymeric binder material having adhesive properties to bond the filaments, only a small amount of the resin/binder is needed. In this regard, the quantity of resin/binder applied is preferably no more than 5% by weight based on the total weight of the filaments plus the resin/binder, such that the filaments comprise at least 95% by weight of the coated fiber/yarn based on the total weight of the filaments plus the resin/binder, and the corresponding tape formed from the yarn will thereby also comprise at least 95% by weight of the component filaments. More preferably, the fibers/yarns and tapes comprise at least about 96% filaments by weight, still more preferably 97% filaments by weight, still more preferably 98% filaments by weight, and still more preferably 99% filaments by weight. Most preferably, the fibers/yarns and tapes are resin-free, i.e. are not coated with a bonding resin/binder, and consist essentially of or consist only of filaments.

In accordance with the process of the invention, the twisted and optionally fused feed fiber/yarn is then compressed, thereby consolidating the component filaments into a monolithic element and flattening said element into the form of a polymeric tape having a preferred average cross-sectional aspect ratio of at least about 10:1. One useful method for forming such a polymeric tape is described in U.S. patent application Ser. No. 12/539,185, which describes a process for the continuous production of polyethylene tape articles. Said process comprises placing a fiber/yarn under a longitudinal tensile force of at least about 0.25 kilogram-force (2.45 Newtons) and subjecting the fiber/yarn to at least one transverse compression step to flatten, consolidate and compress the fiber/yarn. This transverse compression step is preferably conducted at a temperature of from about 25° C. to about 137° C. while maintaining the longitudinal tensile force on the fiber/yarn, thereby forming a tape article having an average cross-sectional aspect ratio of at least about 10:1. This compression step may optionally be repeated one or more times, preferably at a temperature of from about 100° C. to about 160° C. Thereafter, the tape is stretched in at least one stage at a temperature in the range of from about 130° C. to about 160° C. at a stretch rate of from about 0.001 min$^{-1}$ to about 1 min$^{-1}$. This stretching step may optionally be repeated one or more times. During the compression and stretching steps, the longitudinal tensile force may optionally be increased or decreased, or may remain constant. Finally, the tape is cooled to a temperature less than about 70° C. under tension.

Variations of this process are also described therein. For example, in a second embodiment, prior to the compression step, the yarns may first be heated to a temperature of from about 100° C. to about 160° C. and stretched at least once at a stretch rate of from about 0.01 min$^{-1}$ to about 5 min$^{-1}$. It should also be understood that the processing temperatures recited in application Ser. No. 12/539,185 are the preferred temperatures for compressing and stretching polyethylene multi-filament yarns having a c-axis orientation function at least 0.96, an intrinsic viscosity when measured in decalin at 135° C. by ASTM D1601-99 of from about 7 dl/g to 40 dl/g, and a tenacity of from about 15 g/d to about 100 g/d as measured by ASTM D2256-02. Other polymer types, such as aramid or PBO fibers/yarns, may have different optimal processing conditions. For example, aramid fibers/yarns cannot be fused together in the same way as UHMW PE fibers/yarns because aramid fibers/yarns do not melt and maintain strength. However, aramid fibers/yarns can be fused together by first dissolving the fiber surface, such as with sulfuric acid, followed by pressing the filaments together to form a tape. Other fiber types with tape processing conditions similar to aramid fibers/yarns are M5® fibers/yarns, PBO, PBT and all other "liquid crystal" types of fibers/yarns. Fiber types with fusion and tape processing conditions similar to polyethylene fibers are those formed by melt or solution spinning of thermoplastic polymers, such as PET, nylon, polyvinyl acetate (PVA), polypropylene, etc.

Figure 2:
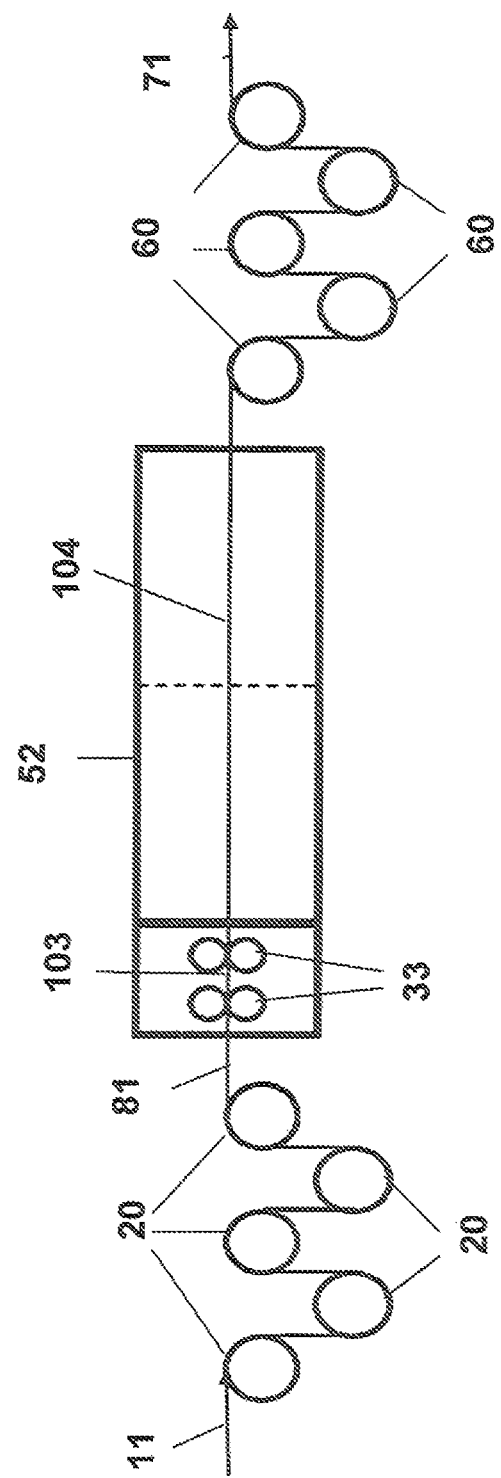
FIG. 2 is a schematic representation of a second apparatus for producing polymeric tapes, illustrating a sequence of compression-compression-stretching.
Figure 3:
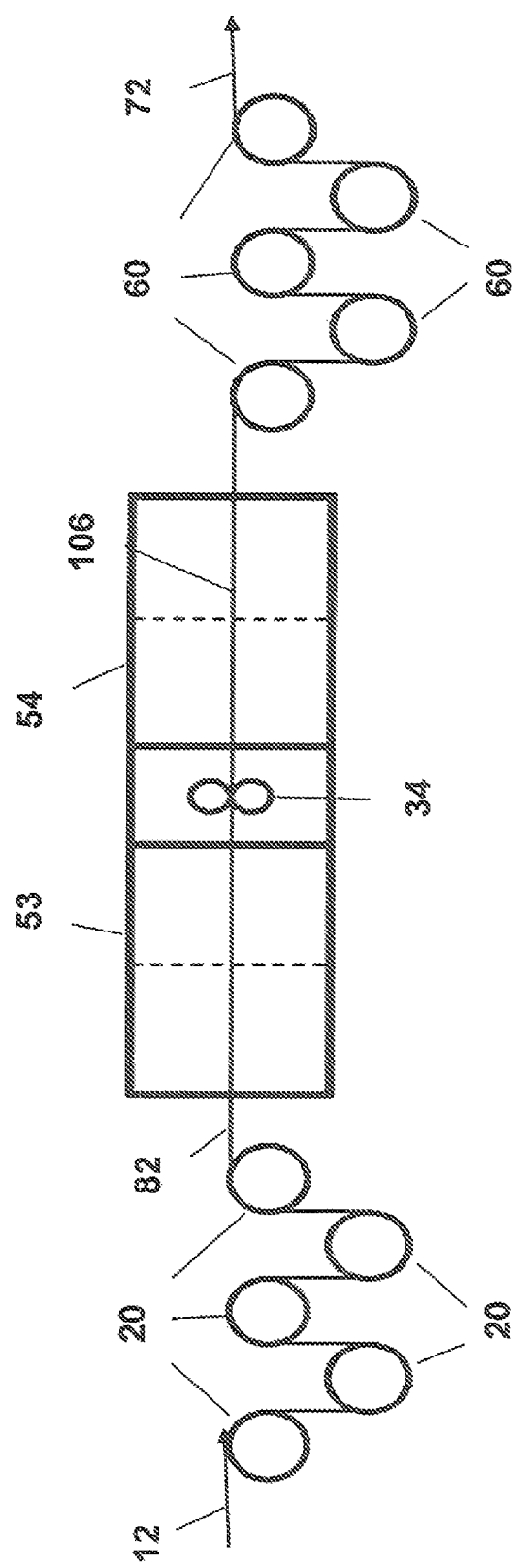
FIG. 3 is a schematic representation of a third apparatus for producing polymeric tapes, illustrating a sequence of stretching-compression-stretching.
Figure 4:
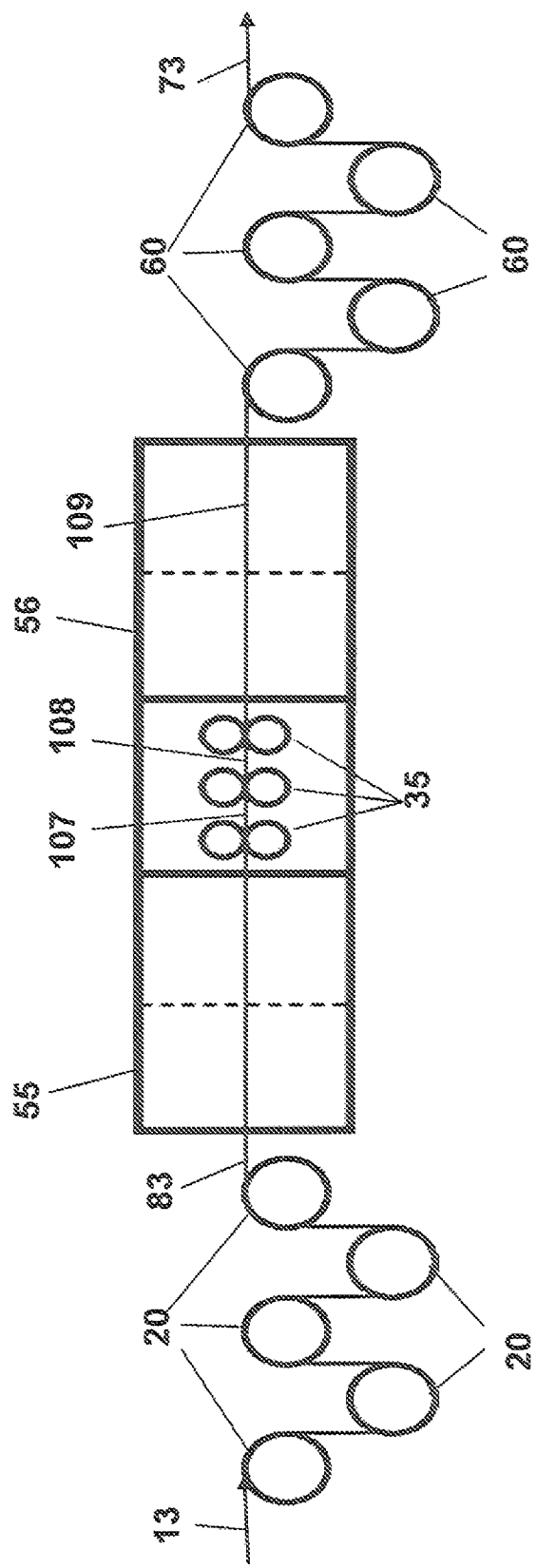
FIG. 4 is a schematic representation of a fourth apparatus for producing polymeric tapes, illustrating a sequence of stretching-three consecutive compressions-stretching.
Figure 7:
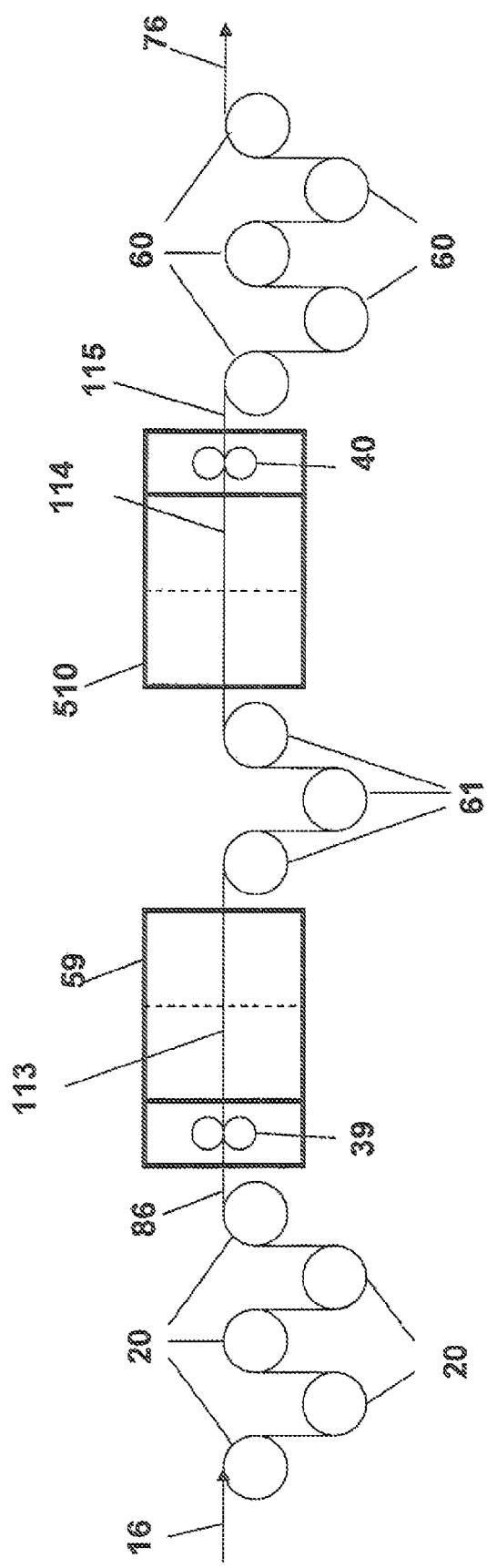
FIG. 7 is a schematic representation of a seventh apparatus for producing polymeric tapes, illustrating a sequence of compression-stretching-stretching at increased tensile force-compression.

A continuous process of the first embodiment (where the fibers/yarns are not stretched prior to compression) is illustrated schematically in FIGS. 1, 2 and 7. A continuous process of the second embodiment (where the fibers/yarns are heated and stretched prior to compression) is illustrated schematically in FIGS. 3-6. The figures illustrating a particular embodiment differ in the number and placement of process equipment, but illustrate the same steps. In each of FIGS. 1 to 7, a selected multi-filament UHMW PE fiber/yarn (10-16, respectively) is unwound from a package or beam (not shown) and is passed over and under several restraining rolls (20). For polyethylene fibers/yarns, the restraining rolls are at temperature of from about 25° C. to about 137° C.

In FIGS. 1-2 and 7, the fiber/yarn leaving the restraining rolls (80, 81, 86, respectively) is passed under tension directly into one or more means (30, 33, 39) for compressing, consolidating, and flattening the fiber/yarn, thereby forming a tape. The tape is subsequently heated and stretched at least once. In FIGS. 3-6, the fiber/yarn leaving the restraining rolls (82-85, respectively) is heated and stretched before being compressed. Heating of a yarn may be by any means, such as by infra-red radiation, contact with a heated surface, or contact with a heated fluid. Preferably, the fiber/yarn is heated and stretched in a forced convection air oven (50-59, 510 in FIGS. 1-7) having multiple temperature zones. For polyethylene fibers/yarns, the fiber/yarn is preferably stretched at least once at temperatures of from about 100° C. to about 160° C. at a stretch rate of from about 0.01 min$^{-1}$ to about 5 min$^{-1}$. The stretch rate is defined as the difference between the speed at which a material leaves a stretch zone ($V_2$) and the speed at which it entered a stretch zone ($V_1$) divided by the length of the stretch zone (L), i.e., $$\text{Stretch Rate} = (V2 - V1)/L, \text{min}^{-1}$$

For polyethylene fibers/yarns, the fiber/yarn is preferably stretched to a stretch ratio of from about 1.01:1 to about 20:1 at a temperature of about 135° C. to about 155° C. Preferably, the stretch ratio is the maximum possible without rupturing the fiber/yarn, and this will vary as would be determined by one skilled in the art depending on the polymer type.

In both of the above embodiments, each fiber/yarn or tape is under a longitudinal tensile force at both the outset and conclusion of compression in each means for compression (30-40). Longitudinal tensile force is regulated by regulating the speeds of successive driven means. In one preferred embodiment, the magnitude of the longitudinal tensile force on the fiber/yarn or tape at the outset of each compression step is substantially equal to the magnitude of the longitudinal tensile force on the fiber/yarn or tape at the conclusion of the same compression step. In the context of the invention, the term "substantially equal" means that the ratio of a lower to higher tensile force across a compression step is at least 0.75:1, preferably at least 0.80:1, more preferably at least 0.85:1, yet more preferably, at least 0.90:1, and most preferably, at least 0.95:1. Such substantially equal longitudinal tensile forces at the outset and conclusion of a compression step is a preferred feature of the process because equal tensile forces across a compression step assures zero tension at the midpoint of compression. However, such substantially equal longitudinal tensile forces are not a mandatory processing condition.

At least for polyethylene fibers/yarns, the longitudinal tensile force is at least 0.25 kilogram-force (abbreviated Kgf, equal to 2.45 Newtons, abbreviated N) on the fiber/yarn or tape at the inlet and at the outlet of a compression step. Preferably, the tensile force is at least 0.5 Kgf (4.9 N), more preferably at least 1 Kgf (9.8 N), yet more preferably at least 2 Kgf (19.6.2 N), and most preferably, at least 4 Kgf (39.2 N) at the outset and conclusion of a compression step. Most preferably, longitudinal tensile force is as high as possible without rupturing the fiber/yarn or tape and without causing slippage of the fiber/yarn or tape in a compression means.

In the preferred embodiments of invention, the illustrated compression means (30-40) in each of FIGS. 1-7 are counter-rotating, opposed rolls (nip rolls). Each nip roll of a unit preferably has the same surface speed, and presses upon the fiber/yarn or tape. Other suitable and well known compression means include nip roll stacks consisting of three or more rolls in a single unit that provide two or more compressions, pairs of moving belts that press from opposite sides against the fiber/yarn or tape, rolls where the fiber/yarn or tape makes a 180° turn under high tension and the like. The pressure applied by nip rolls and moving belts may be actuated by hydraulic cylinders or the pressure may result from fixing a gap between the rolls at a dimension smaller than the thickness of the incoming material. Still other compression means are possible and are contemplated.

The means for compression may be vibrated. Considering the tape to be a quasi-two dimensional object with length and width but negligible thickness, the vibration may be in a direction normal to the plane of the tape, or in the plane of the tape or in a direction inclined to both planes. The vibration may be of low frequency or of sonic or ultra-sonic frequencies. The vibration may be used as an aid in consolidation by imparting additional pulses of pressure or shear. It may also be used to produce periodic variations in thickness or width of the compressed tape useful for bonding in composite applications.

The pressure exerted in a compression step in each embodiment is from about 20 to about 10,000 pounds per square inch (psi) (about 0.14 to about 69 MPa), preferably from about 50 to about 5000 psi (about 0.34 to about 34 MPa), and more preferably from about 50 to about 2500 psi (about 0.69 to about 17 MPa). The pressure is preferably increased at successive stages of compression. The compression means are preferably at a temperature of from about 25° C. to about 160° C., more preferably from about 50° C. to about 155° C., and most preferably from about 100° C. to about 150° C. In the most preferred embodiments where the tape comprises UHMW PE filaments, the yarns are compressed/flattened into tapes at a temperature of from about 145° C. to about 155° C. and at a pressure of from about 2700 to about 3000 psi or greater.

After passage through at least one compression means, e.g. (30) in FIG. 1, a now formed tape (100) is preferably heated and stretched at least once. Heating of the tape may be by any means, such as by infra-red radiation, contact with a heated surface, or contact with a heated fluid. Preferably, the tape is heated and stretched in a forced convection air oven (50, 51) having multiple temperature zones (demarcated by the dashed lines in the figures). Not shown in the figures are heaters and blowers that heat and circulate the air through the oven.

At least for polyethylene tapes, stretching of the tape is at a temperature of from about 100° C. to about 160° C., and preferably from about 135° C. to about 150° C. The tape is stretched at a stretch rate of from about 0.001 min$^{-1}$ about 1 min$^{-1}$. Preferably the tape is stretched at a stretch rate of from about 0.001 min$^{-1}$ to about 0.1 min$^{-1}$. Preferably the tape is stretched to a stretch ratio of from about 1.01:1 to 20:1.

Figure 5:
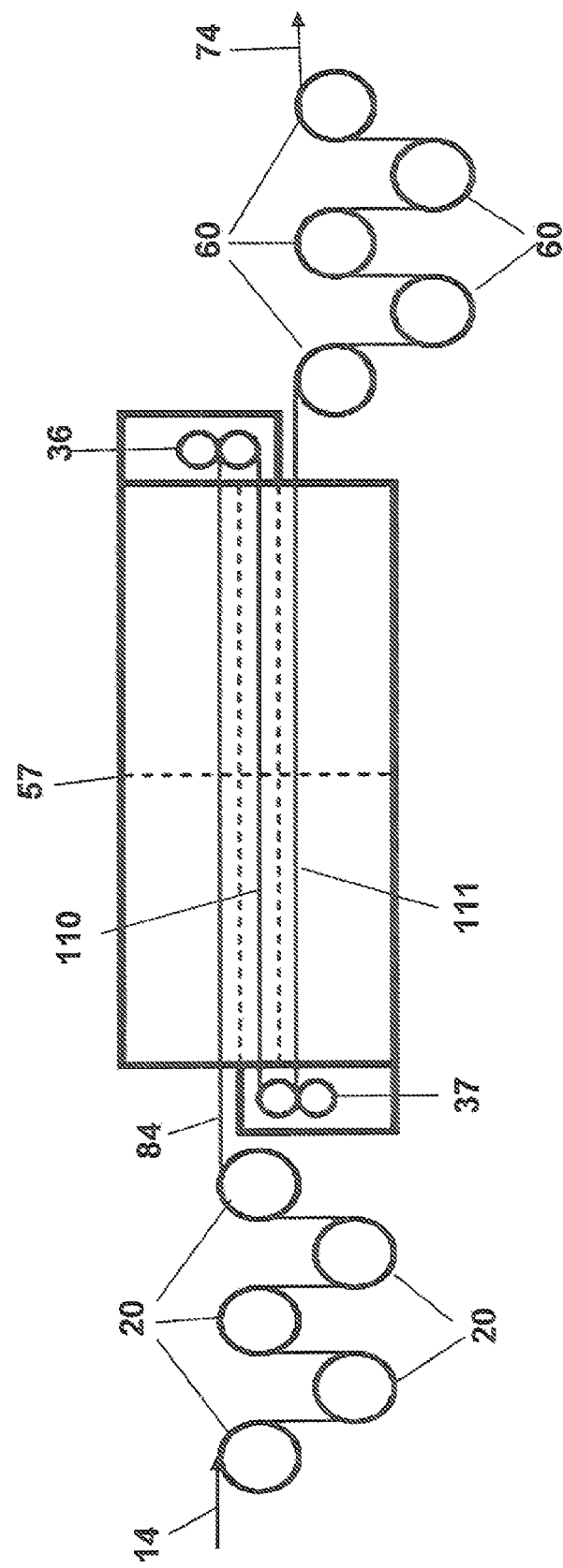
FIG. 5 is a schematic representation of a fifth apparatus for producing polymeric tapes, illustrating a sequence of stretching-compression-stretching-compression-stretching in a six zone oven.
Figure 6:
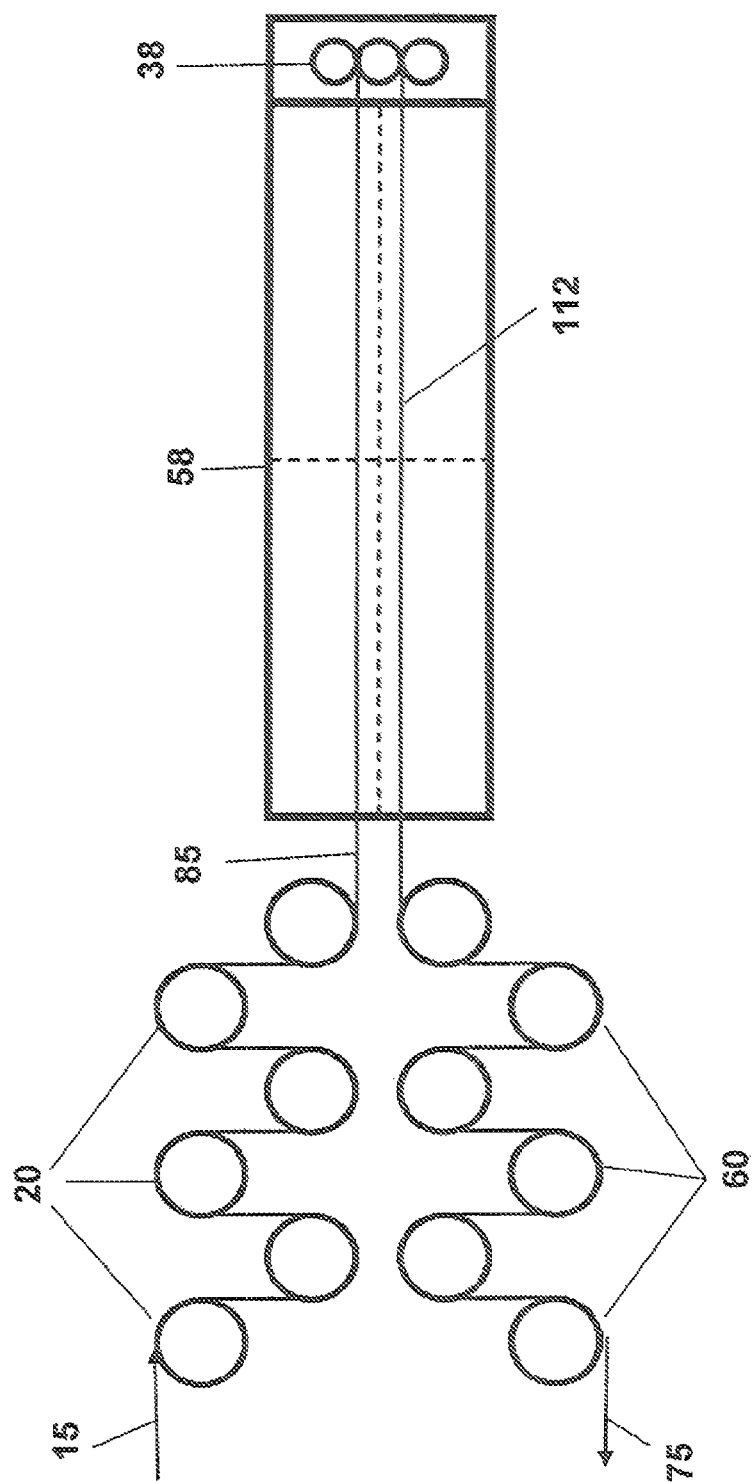
FIG. 6 is a schematic representation of a sixth apparatus for producing polymeric tapes, illustrating a sequence of stretching-two consecutive compressions-stretching in a four zone oven.

The stretching force may be applied by any convenient means such as by passing the fiber/yarn/tape over and under a sufficient number of driven rolls (60), as illustrated in FIGS. 2, 3, 4 and 6; by compression means (31,32, 40) as illustrated in FIGS. 1 and 7; by both compression means (36, 37,40) and driven rolls (60, 61) as in FIGS. 5 and 7; or by winding the fiber/yarn/tape multiple times around a driven godet and idler roll pair (not illustrated). Driven rolls applying the stretching force may be internal to the oven or outside of the oven.

The longitudinal tensile force need not be the same throughout a continuous operation. Optionally, a fiber/yarn or tape may be relaxed to lower longitudinal tensile force or permitted to shrink less than about 5% between successive compressions or stretches by tension isolation means. Alternatively, tension may be increased between successive compressions or stretches by tension isolation means. In FIG. 7, rolls (61) act as tension isolation means. The tensile force on tape (114) (i.e. tape in a second oven) can be either greater or less than on tape (113) (i.e. tape in a first oven), depending on the speed of nip rolls (39) and (40) and the temperatures in the two ovens. In either case, the speed of restraining rolls (20) and driven rolls (60) are adjusted to maintain the tensile force constant across the compression means (39 and 40).

The tape is cooled under tension prior to being conveyed to a winder. The length of the tape may diminish slightly due to thermal contraction, but tension should be sufficiently high during cooling to prevent shrinkage beyond thermal contraction. Preferably, the tape is cooled on rolls (60) and the rolls are cooled by natural convection, forced air, or are internally water-cooled. The final stretched tape (70-76), cooled under tension to a temperature less than about 70° C., is wound up under tension (winder not shown) as a package or on a beam.

As noted above, the number and placement of compression and stretching means may be varied within a particular embodiment as is illustrated schematically in the Figures. Many other processing sequences consistent with one of either the first or second embodiments of the invention are possible, and are contemplated. Preferably, a process of the invention produces a tape having a tensile strength of at least 75% of the strength of the fiber/yarn from which it is made, and more preferably the tape tenacity is substantially equal to the feeder fiber/yarn tenacity. Most preferably, a process of the invention produces a tape having a higher tensile strength than the yarn from which it is made. In this regard, while fiber/yarn tenacity is measured by ASTM D2256-02 (at 10 inch (25.4 cm) gauge length and at an extension rate of 100%/min), tape tensile strength is measured by ASTM D882-09 (at 10 inch (25.4 cm) gauge length and at an extension rate of 100%/min). Typically the tape UTS will be about 3-5 g/d lower than the feed fiber/yarn. For example, for a feeder fiber/yarn having a UTS of 45 g/denier, the tape UTS could be approximately 40 g/denier, or for a 35-37 g/denier UTS fiber/yarn, the tape UTS could be approximately 30-35 g/denier.

Figure 8:
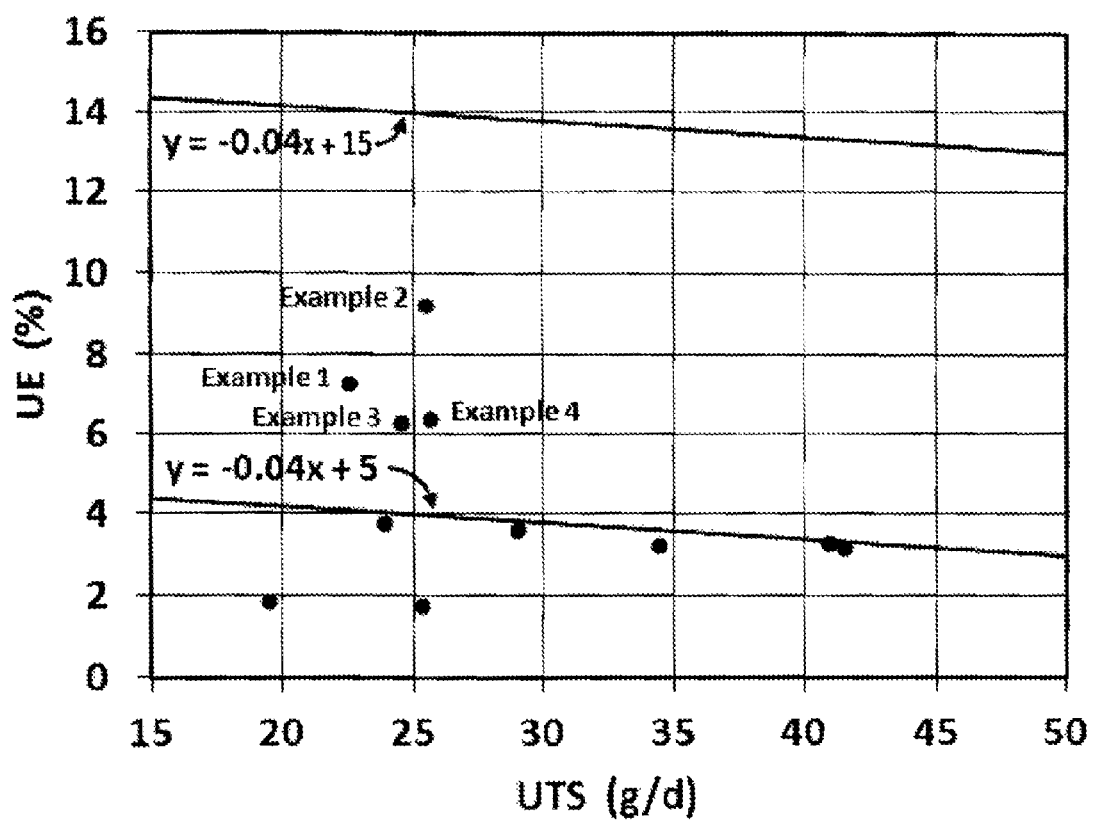
FIG. 8 is a graphic representation illustrating the range of the formula y=−0.04x+b, where b=5 and where b=15.

Together with twisting of the fiber/yarn, the heating and compression steps that form the tape from the twisted fiber/yarn achieve the enhanced UE % of the resulting polymeric tape. In this regard, the UE % of the inventive tapes can be defined in terms of its proportional relationship to the UTS. Specifically, the tape UE % can be defined by the following formula:

$$y = -0.04x + b$$

where y is the ultimate elongation (measured in %), wherein x is the ultimate tensile strength (measured in g/denier) of the tape, where b=5 or greater, and where x (UTS) is 15 g/denier or greater, more preferably x is 20 g/denier or greater, still more preferably x is 22 g/denier or greater, still more preferably where x is 25 g/denier or greater, still more preferably where x is 30 g/denier or greater, still more preferably where x is 35 g/denier or greater, still more preferably where x is 40 g/denier or greater, still more preferably where x is 45 g/denier or greater, still more preferably where x is 50 g/denier or greater, still more preferably where x is 55 g/denier or greater, still more preferably where x is 60 g/denier or greater, still more preferably where x is 65 g/denier or greater, still more preferably where x is 70 g/denier or greater, and still more preferably where x is 75 g/denier or greater. This relationship is illustrated in FIG. 8. Polymeric tapes achieving these properties will be formed from fibers/yarns that have been twisted at least about 0.5 turns of twist per inch of fiber/yarn length up to about 15 twists per inch. Accordingly, the b value, i.e. the value where the line plotted in FIG. 8 would cross the y-axis, will range from 5 to 15. Alternative ranges for the b value are 5.5 to 15, 6.0 to 15, 7.0 to 15, 7.5 to 15, 8.0 to 15, 8.5 to 15, 9.0 to 15, 9.5 to 15 and 10 to 15, as well as alternatively 5.5 to 13, 6.0 to 13, 7.0 to 13, 7.5 to 13, 8.0 to 13, 8.5 to 13, 9.0 to 13, 9.5 to 13 and 10 to 13; or alternatively 5.5 to 10, 6.0 to 10, 7.0 to 10, 7.5 to 10, 8.0 to 10, 8.5 to 10, 9.0 to 10, and 9.5 to 10. It is also most preferred, though not required, that the polymeric tapes of the invention have a UE % of at least 5.0%, such that y=at least 5.0(%), with an expected maximum UE of 15.0%.

Figure 9:
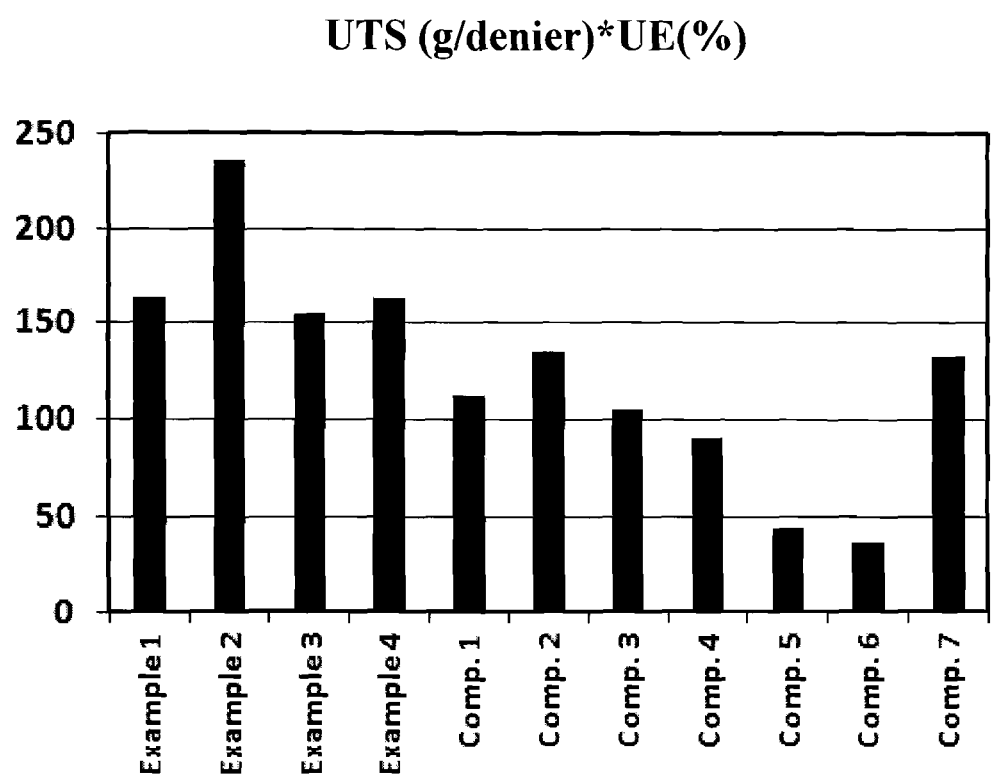
FIG. 9 is a graphic representation illustrating the UTS*UE % data presented in Table 1.

FIG. 9 is a bar graph illustrating the relationship between UTS and UE % for the inventive polymeric tapes from a different perspective, wherein the tapes have an ultimate tensile strength of at least 15 g/denier and wherein the product of the ultimate tensile strength (g/denier) of the tape and the ultimate elongation (%) of the tape (UTS*UE) is at least 150. More preferably, the UTS*UE value is at least about 160, still more preferably at least about 170, still more preferably at least about 180, still more preferably at least about 190, and most preferably the UTS*UE value is at least about 200. For example, a tape having a UTS of 15 g/denier and a UE % of 10% will have a UTS*UE value of 150. A tape having a UTS of 40 g/denier and a UE % of 4.0% will have a UTS*UE value of 160. As stated above, the UE % is controlled partially by the twist amount of the pre-compressed fiber/yarn, as well as the natural UE % of the polymeric feed fiber/yarn. The achievable twist amount depends to some degree on the fiber/yarn denier. For example, tapes formed from untwisted SPECTRA® UHMW PE fibers/yarns identified in Comparative Examples 1-4 having tenacities ranging from 23.9 g/denier to 40.9 g/denier have ultimate elongations ranging from about 3.2 to about 9. The data plotted in FIG. 9 is outlined in Table 1, and additional examples are provided in the Examples section below.

The polymeric tapes produced according to the processes of the invention may be fabricated into woven and/or non-woven fabric materials that have superior ballistic penetration resistance. For the purposes of the invention, articles that have superior ballistic penetration resistance describe those which exhibit excellent properties against deformable projectiles, such as bullets, and against penetration of fragments, such as shrapnel.

The inventive polymeric tapes may be fabricated into woven fabrics/composites and non-woven fabrics/composites according to the same techniques that may be employed when fabricating woven and non-woven fabrics/composites from fibers/yarns rather than tapes. For example, in a preferred embodiment herein, a non-woven fabric is preferably formed by stacking one or more plies of randomly oriented polymeric tapes (e.g. a felt or a mat construction) or unidirectionally aligned, parallel polymeric tapes, and then consolidating the stack to form a tape layer. In this regard, a "tape layer" as used herein may comprise a single-ply of non-woven tapes or a plurality of non-woven tape plies. A tape layer may also comprise a woven fabric or a plurality of consolidated woven fabrics. A "layer" describes a generally planar arrangement having both an outer top surface and an outer bottom surface. A single "ply" of unidirectionally oriented tapes comprises an arrangement of generally non-overlapping tapes that are aligned in a unidirectional, substantially parallel array, and is also known in the art as a "unitape", "unidirectional tape", "UD" or "UDT." As used herein, an "array" describes an orderly arrangement of tapes, which is exclusive of woven fabrics. A "parallel array" describes an orderly parallel arrangement of tapes where the tapes are arranged unidirectionally in a side-by-side, substantially parallel, planar relation to each other, most typically such that only their edges are in contact with each other. A UD or UDT layer/ply is a laminate formed by laminating (consolidating) these substantially parallel tapes together. The term "oriented" as used in the context of "oriented tapes" refers to the alignment of the tapes as opposed to stretching of the tapes.

As used herein, "consolidating" refers to combining a plurality of tape layers or plies into a single unitary structure, with or without the assistance of a polymeric binder material. Consolidation can occur via drying, cooling, heating, pressure or a combination thereof. Heat and/or pressure may not be necessary, as the tapes or tape layers/plies may just be glued together, as is the case in a wet lamination process. The term "composite" refers to combinations of tapes, optionally with a least one polymeric binder material. As stated above, this polymeric binder material may be an adhesive used to bond the yarn filaments together before or during the compression step. A "complex composite" refers to a consolidated combination of a plurality of tape layers.

As described herein, "non-woven" fabrics include all fabric structures that are not formed by weaving. For example, non-woven fabrics may comprise a plurality of unitapes that are optionally at least partially coated with a polymeric binder material, stacked/overlapped and consolidated into a single-layer, monolithic element. Non-woven fabrics may also comprise felts or mats that comprise non-parallel, randomly oriented tapes that are optionally coated with a polymeric binder composition.

Generally, a polymeric binder coating, also commonly known in the art as a "polymeric matrix" material, is necessary to efficiently merge, i.e. consolidate, a plurality of non-woven plies/layers formed from yarns/fibers. A similar polymeric binder coating may be used when forming non-woven plies/layers from polymeric tapes. However, due to the unique process used to form the polymeric tapes where fibers/yarns are compressed at high temperatures and pressures, it is a unique feature of this invention that a binder/matrix coating is optional and not required. The flat structure of the tapes allows them to be merely hot-pressed together with sufficient bonding according to the consolidation conditions described herein. When the tapes are formed into woven fabrics, coating the woven fabrics with a polymeric binder material may be desired when it is desired to consolidate a plurality of stacked woven fabrics into a complex composite. However, a stack of woven fabrics may be may be attached by other means as well, such as with a conventional adhesive layer or by stitching.

To the extent that a resin is used, ballistic resistant articles may be consolidated with a lower quantity of binder/matrix resin than is typically needed for forming articles from uncompressed yarns because the resin need only be applied as a surface layer without impregnating or coating the individual component filaments of the tape to promote bonding of a tape layer to another layer of the tape. Accordingly, the total weight of the binder/matrix coating in a composite preferably comprises from about 0% to about 10%, still more preferably from about 0% to about 5% by total weight of the component filaments plus the weight of the coating. Even more preferably, ballistic resistant articles of the invention comprise from about 0% to about 2% by weight of a binder/matrix coating, or about 0% to about 1% by weight, or only about 1% to about 2% by weight. Most preferably, both woven and non-woven ballistic resistant articles fabricated from the polymeric tapes of the invention are entirely resin-free as described in commonly-owned U.S. patent application Ser. No. 61/570,071, which is incorporated herein by reference to the extent consistent herewith.

Even when a polymeric matrix/binder material is not needed for its adhesive properties, such a coating may also be desirable to provide a fabric with other properties, such as abrasion resistance and resistance to deleterious environmental conditions, so it may still be desirable to coat the tapes with such a binder material. In this regard, when used a polymeric binder material will partially or substantially coat the individual tapes of the tape layers. Suitable polymeric binder materials include both low modulus materials and high modulus materials. Low modulus polymeric matrix binder materials generally have a tensile modulus of about 6,000 psi (41.4 MPa) or less according to ASTM D638 testing procedures and are typically employed for the fabrication of soft, flexible armor, such as ballistic resistant vests. High modulus materials generally have a higher initial tensile modulus than 6,000 psi and are typically employed for the fabrication of rigid, hard armor articles, such as helmets.

A low modulus elastomeric material preferably has a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. A low modulus elastomeric material also has a preferred elongation to break of at least about 50%, more preferably at least about 100% and most preferably has an elongation to break of at least about 300%.

Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some filament types), acrylonitrile butadiene styrene, polycarbonates, and combinations thereof, as well as other low modulus polymers and copolymers curable below the melting point of the filaments forming the tapes. Also preferred are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Düsseldorf, Germany. Particularly preferred low modulus polymeric binder polymers comprise styrenic block copolymers sold under the trademark KRATON® commercially produced by Kraton Polymers. A particularly preferred polymeric binder material comprises a polystyrene-polyisoprene-polystyrene-block copolymer sold under the trademark KRATON®.

Also particularly preferred are acrylic polymers and acrylic copolymers. Acrylic polymers and copolymers are preferred because their straight carbon backbone provides hydrolytic stability. Acrylic polymers are also preferred because of the wide range of physical properties available in commercially produced materials. Preferred acrylic polymers non-exclusively include acrylic acid esters, particularly acrylic acid esters derived from monomers such as methyl acrylate, ethyl acrylate, n-propyl acrylate, 2-propyl acrylate, n-butyl acrylate, 2-butyl acrylate and tert-butyl acrylate, hexyl acrylate, octyl acrylate and 2-ethylhexyl acrylate. Preferred acrylic polymers also particularly include methacrylic acid esters derived from monomers such as methyl methacrylate, ethyl methacrylate, n-propyl methacrylate, 2-propyl methacrylate, n-butyl methacrylate, 2-butyl methacrylate, tert-butyl methacrylate, hexyl methacrylate, octyl methacrylate and 2-ethylhexyl methacrylate. Copolymers and terpolymers made from any of these constituent monomers are also preferred, along with those also incorporating acrylamide, n-methylol acrylamide, acrylonitrile, methacrylonitrile, acrylic acid and maleic anhydride. Also suitable are modified acrylic polymers modified with non-acrylic monomers. For example, acrylic copolymers and acrylic terpolymers incorporating suitable vinyl monomers such as: (a) olefins, including ethylene, propylene and isobutylene; (b) styrene, N-vinylpyrrolidone and vinylpyridine; (c) vinyl ethers, including vinyl methyl ether, vinyl ethyl ether and vinyl n-butyl ether; (d) vinyl esters of aliphatic carboxylic acids, including vinyl acetate, vinyl propionate, vinyl butyrate, vinyl laurate and vinyl decanoates; and (f) vinyl halides, including vinyl chloride, vinylidene chloride, ethylene dichloride and propenyl chloride. Vinyl monomers which are likewise suitable are maleic acid diesters and fumaric acid diesters, in particular of monohydric alkanols having 2 to 10 carbon atoms, preferably 3 to 8 carbon atoms, including dibutyl maleate, dihexyl maleate, dioctyl maleate, dibutyl fumarate, dihexyl fumarate and dioctyl fumarate.

Most specifically preferred are polar resins or polar polymer, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably co-solvent free. Such includes aqueous anionic polyurethane dispersions, aqueous cationic polyurethane dispersions and aqueous nonionic polyurethane dispersions. Particularly preferred are aqueous anionic polyurethane dispersions, and most preferred are aqueous anionic, aliphatic polyurethane dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

Preferred high modulus binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. A particularly preferred rigid polymeric binder material for use in this invention is a thermosetting polymer, preferably soluble in carbon-carbon saturated solvents such as methyl ethyl ketone, and possessing a high tensile modulus when cured of at least about $1 \times 10^6$ psi (6895 MPa) as measured by ASTM D638. Particularly preferred rigid polymeric binder materials are those described in U.S. Pat. No. 6,642,159, the disclosure of which is incorporated herein by reference. The rigidity, impact and ballistic properties of the articles formed from the composites of the invention are affected by the tensile modulus of the polymeric binder polymer coating the tapes. The polymeric binder, whether a low modulus material or a high modulus material, may also include fillers such as carbon black or silica, may be extended with oils, or may be vulcanized by sulfur, peroxide, metal oxide or radiation cure systems as is well known in the art.

A polymeric matrix/binder may be applied either simultaneously or sequentially to a plurality of tapes, which may be arranged as a web or as an array, to thereby form a coated web/array. The matrix/binder may also be applied to an already woven fabric to form a coated woven fabric, or as another arrangement, to thereby coat the tape layers with the matrix/binder. The polymeric binder material may be applied onto the entire surface area of the individual tapes or only onto a partial surface area of the tapes, but most preferably the polymeric binder material is applied onto substantially all the surface area of each individual polymeric tape forming a tape layer of the invention.

The polymeric material may also be applied onto tapes prior to weaving the coated tapes into a woven fabric or prior to forming the tapes into a tape layer. Techniques of forming woven fabrics are well known in the art and any fabric weave may be used, such as plain weave, crowfoot weave, basket weave, satin weave, twill weave and the like. Plain weave is most common, where tapes are woven together in an orthogonal 0°/90° orientation. Also useful are 3D weaving methods wherein multi-layer woven structures are fabricated by weaving warp and weft tape threads both horizontally and vertically.

Techniques for forming non-woven fabrics from fibers/yarns are well known in the art, and those techniques apply similarly to the inventive polymeric tapes. In a typical process, a plurality of tapes are arranged into at least one array, typically being arranged as a tape web comprising a plurality of tapes aligned in a substantially parallel, unidirectional array. The tapes may then be coated with a binder material if desired, and the coated tapes are then formed into non-woven tape plies, i.e. unitapes. If a binder material is not used, tape-based unitapes may be formed, for example, by lining up the tapes side-by-side in a substantially parallel array, followed by pressing the array with heat and pressure to bond the tapes together into a sheet. This sheet may then be trimmed into the desired size to form one or more tape-based unitape plies. In another embodiment, continuous tapes may be wound around a plate, such as described in commonly-owned U.S. Pat. No. 5,135,804, followed by inserting the plate into a press and pressing it with heat and/or pressure to bond the tapes together, after which the bound tapes may be cut or trimmed. U.S. Pat. No. 5,135,804, which is incorporated by reference herein, teaches winding fibers around a 3-inch square metal plate. For the purposes of this invention, the metal plate employed may be any size and is not limited to a 3-inch square. This process may also be employed by winding tapes around the plate in multiple directions to form a multi-ply structure.

To form a multi-ply, non-woven tape layer, a plurality of unitapes formed by any method are then overlapped atop each other and consolidated into single-layer, monolithic element, most preferably wherein the parallel tapes of each single-ply are positioned orthogonally to the parallel tapes of each adjacent single-ply, relative to the direction of the central longitudinal axis of the tapes in a tape ply. Although orthogonal 0°/90° tape orientations are preferred, adjacent plies can be aligned at virtually any angle between about 0° and about 90° with respect to the central longitudinal axis of another tape ply. For example, a five ply non-woven structure may have plies oriented at a 0°/45°/90°/45°/0° or at other angles, such as rotations of adjacent plies/layers in 15° or 30° increments. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith.

The stack of overlapping, non-woven tape plies is consolidated either under heat and pressure or by adhering the coatings of individual tape plies to each other to form a non-woven composite fabric. Non-woven tape layers or fabrics preferably include from 1 to about 6 adjoined tape plies, but may include as many as about 10 to about 20 plies as may be desired for various applications. The greater the number of plies translates into greater ballistic resistance, but also greater weight.

Methods useful for consolidating tape plies to form tape layers and composites are well known from the art of fibers/yarns, such as by the methods described in U.S. Pat. No. 6,642,159. Consolidation can occur via drying, cooling, heating, pressure or a combination thereof. Heat and/or pressure may not be necessary, as the tape layers may just be glued together, as is the case in a wet lamination process. Typically, consolidation is done by positioning the individual tape plies on one another under conditions of sufficient heat and pressure to cause the plies to combine into a unitary article. Consolidation may be done at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that the polymeric binder coating can be caused to stick or flow without completely melting. However, generally, if the polymeric binder material is caused to melt, relatively little pressure is required to form the composite, while if the binder material is only heated to a sticking point, more pressure is typically required. As is conventionally known in the art, consolidation may be conducted in a calendar set, a flat-bed laminator, a press or in an autoclave. Consolidation may also be conducted by vacuum molding the material in a mold that is placed under a vacuum. Vacuum molding technology is well known in the art. Most commonly, a plurality of orthogonal tape webs are "glued" together with a small amount of binder polymer (<5% by weight) and run through a flat bed laminator to improve the uniformity and strength of the bond. Further, the consolidation and polymer application/bonding steps may comprise two separate steps or a single consolidation/lamination step.

Alternately, consolidation may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the tape layers and fabric composites of the invention are molded has a direct effect on the stiffness or flexibility of the resulting molded product. Particularly, the higher the pressure at which they are molded, the higher the stiffness, and vice-versa. In addition to the molding pressure, the quantity, thickness and composition of the tape plies and polymeric binder coating type also directly affects the stiffness of the articles formed from the composites.

While each of the molding and consolidation techniques described herein are similar, each process is different. Particularly, molding is a batch process and consolidation is a generally continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber/yarn type used to fabricate the polymeric tapes.

The tape layers or composites may also optionally comprise one or more thermoplastic polymer layers attached to one or both of the outer surfaces of the layer or composite. Suitable polymers for the thermoplastic polymer layer non-exclusively include polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France. Such a thermoplastic polymer layer may be bonded to the tape layer/composite surfaces using well known techniques, such as thermal lamination. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic polymer layers may alternatively be bonded to the outer surfaces with hot glue or hot melt fibers as would be understood by one skilled in the art.

To produce a ballistic resistant article from the polymeric tapes of the invention having sufficient ballistic resistance properties, the total weight of the binder/matrix coating in a composite preferably comprises from about 0% to about 10% by weight, more preferably from about 0% to about 7%, and most preferably from about 0% to about 5% by weight of the filaments (which form the tapes) plus the weight of the coating.

The thickness of the tape layers will correspond to the thickness of the individual tapes and the number of tape plies incorporated into the material. For example, a preferred woven fabric will have a preferred thickness of from about 25 µm to about 600 µm per ply/layer, more preferably from about 50 µm to about 385 µm and most preferably from about 75 µm to about 255 µm per ply/layer. A preferred two-ply non-woven fabric will have a preferred thickness of from about 12 µm to about 600 µm, more preferably from about 50 µm to about 385 µm and most preferably from about 75 µm to about 255 µm. Any thermoplastic polymer layers are preferably very thin, having preferred layer thicknesses of from about 1 µm to about 250 µm, more preferably from about 5 µm to about 25 µm and most preferably from about 5 µm to about 9 µm. Discontinuous webs such as SPUNFAB® non-woven webs are preferably applied with a basis weight of 6 grams per square meter (gsm). While such thicknesses are preferred, it is to be understood that other thicknesses may be produced to satisfy a particular need and yet fall within the scope of the present invention.

Articles of the invention may be formed from tape layers or composites that comprise only one type of tape or that comprise a hybrid structure including more than one type of tape. For example, an article may be fabricated from at least two different polymeric tape types wherein a first tape type has a first number of twists per inch of yarn length and a second tape type has a second number of twists per inch of yarn length, wherein the first number of twists and the second number of twists per inch of yarn length are different. Alternatively, an article may be fabricated from at least two different polymeric tape types where each polymeric tape type has the same number of twists per inch of yarn length, but where the tapes comprise different filament polymer types, such as a combination of UHMW PE tapes and aramid tapes. In yet another alternative embodiment, an article may be fabricated from a combination of tapes that were thermally bonded together before compression, and tapes that were adhesively bonded together before compression.

The fabrics of the invention may be used in various applications to form a variety of different ballistic resistant articles using well known techniques, including flexible, soft armor articles as well as rigid, hard armor articles. For example, suitable techniques for forming ballistic resistant articles are described in, for example, U.S. Pat. Nos. 4,623,574, 4,650,710, 4,748,064, 5,552,208, 5,587,230, 6,642,159, 6,841,492 and 6,846,758, all of which are incorporated herein by reference to the extent not incompatible herewith. The composites are particularly useful for the formation of hard armor and shaped or unshaped sub-assembly intermediates formed in the process of fabricating hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. Such hard articles are preferably, but not exclusively, formed using a high tensile modulus binder material.

The structures can be cut into a plurality of discrete sheets and stacked for formation into an article or they can be formed into a precursor which is subsequently used to form an article. Such techniques are well known in the art. In a most preferred embodiment of the invention, a tape composite comprising a plurality of tape layers/plies is provided wherein a thermoplastic polymer is bonded to at least one outer surface of each tape layer/ply either before, during or after a consolidation step which consolidates the plurality of tape layers/plies, wherein the plurality of tape layers/plies are subsequently merged by another consolidation step which consolidates the plurality of tape layers into an armor article or sub-assembly of an armor article.

The following examples serve to illustrate the invention.

EXAMPLE 1

A 1200 denier SPECTRA® 900 multi-filament UHMW PE yarn was twisted in the S-direction to form a twisted yarn having 7 turns per inch (TPI) (2.76 turns/cm). The tenacity of this S-twisted yarn was approximately 30-32 g/denier.

This was repeated with a second 1200 denier SPECTRA® 900 multi-filament UHMW PE yarn, and the two S-twisted 7 TPI yarns were then cabled together in the Z-direction with 5 turns per inch (1.97 turns/cm) to form a 2400 denier cabled yarn. This cabled yarn was then simultaneously drawn and fused according to the techniques described in commonly-owned U.S. Pat. No. 7,966,797, which is incorporated herein by reference to the extent consistent herewith. Drawing and fusing for this example was conducted at 155.5° C. in a 24 meter long oven at a draw ratio of 2.66 (15 meters/min feed speed; 40 meters/min take up speed).

The heating and drawing step transforms the multi-filament cabled yarn into a fused monofilament-like yarn, where the "monofilament-like" means that the multiple filaments comprising the yarns are fused together at least to some degree, giving the yarn a monofilament or substantially monofilament appearance and feel. The resulting monofilament-like yarn had a denier of 1053, an ultimate elongation (UE %) of 4.05% and a tenacity (UTS) of 28.1 g/denier.

The monofilament-like drawn/fused cabled yarn was then cold pressed, i.e. flattened between two rolls at room temperature (70-72° F.) (21-22° C.) according to the methods described in U.S. patent application Ser. No. 12/539,185, thereby forming a polymeric tape having a UTS of 22.5 g/d, a UE % of 7.3% and a denier of 1114.

EXAMPLE 2

A 2400 denier SPECTRA® 900 multi-filament UHMW PE yarn (2×1200 denier SPECTRA® 900 multifilament UHMW PE yarns) was twisted into a 7 TPI twisted yarn. Unlike Example 1, the two 1200 denier yarns forming the combined 2400 denier yarn of this example was not cabled. The 2400 denier yarn was then simultaneously drawn and fused in a 24 meter long oven as in Example 1, thereby forming a fused monofilament-like yarn. The UTS of the monofilament-like yarn was 29.7 g/d. The UE % was 4.09% and the denier was 1061. This monofilament-like yarn was then cold pressed and flattened between two rolls at room temperature according to the methods described in U.S. patent application Ser. No. 12/539,185, thereby forming a polymeric tape having a UTS of 25.5 g/d, a UE % of 9.24%, and a denier of 1072.

EXAMPLE 3

Example 1 was repeated thereby forming a polymeric tape having a UTS of 24.5 g/denier, a UE % of 6.32% and a denier of 1043.

EXAMPLE 4

Example 2 was repeated thereby forming a polymeric tape having a UTS of 25.6 g/denier, a UE % of 6.39% and a denier of 1045.

EXAMPLE 5

A 2400 denier SPECTRA® 900 multi-filament UHMW PE yarn (2×1200 denier SPECTRA® 900 multifilament UHMW PE yarns) is twisted into an 11 TPI (4.33 turns/cm) twisted yarn. The twisted yarn is then simultaneously drawn and fused in a 24 meter long oven as in Examples 1-4 at 155.5° C. with a draw ratio of 2.66, thereby forming a fused monofilament-like yarn. The monofilament-like yarn is then cold pressed and flattened at room temperature as in Examples 1-4, thereby forming a polymeric tape having a UTS of 22 g/d, a UE % of 10% and a denier of 1100.

EXAMPLE 6

Example 5 is repeated except that the 2400 denier SPECTRA® 900 yarn is twisted into a 7 TPI twisted yarn, and the monofilament-like yarn formed therefrom is hot pressed/flattened into a tape at 150° C. rather than cold pressed/flattened into a tape at room temperature (21-22° C.). The resulting polymeric tape has a UTS of 24 g/d, a UE % of 11% and a denier of 1100.

COMPARATIVE EXAMPLES 1-7

The polymeric tapes of inventive Examples 1-4 are compared to other known polymeric tapes having the properties outlined in Table 1 below. Comparative Examples 1-3 present the properties of tapes formed by drawing, fusing and flattening untwisted multifilament UHMW PE yarns that are analogous to the feeder yarns of inventive Examples 1-3 but without being twisted. Comparative Example 4 identifies the known properties of a tape formed according to U.S. Pat. No. 4,623,574. Comparative Example 5 identifies the known properties of polyethylene tapes commercially available from Teijin Fibers Ltd. under the trademark ENDUMAX® TA23. Comparative Example 6 identifies the known properties of polyethylene tapes commercially available from DuPont under the trademark TENSYLON® HT1900. Comparative Example 7 identifies the known properties of polyethylene tapes commercially available from DSM as described in their U.S. patent application publication no. 2008/0156345.

The data summarized in Table 1 below is further illustrated in FIGS. 8 and 9. Specifically, FIG. 8 is a graphic representation illustrating the range of the curve defined by the formula y=−0.04x+b, where b=5 and where b=15, and how the data for Comparative Examples 1-7 relates to this curve. FIG. 9 is a graphic representation illustrating the UTS*UE % data presented in Table 1 for inventive Examples 1-4 and Comparative Examples 1-7.

TABLE 1

| Example | UTS (g/denier) | UE % | UTS*UE % |
|---|---|---|---|
| 1 | 22.5 | 7.28 | 163.8 |
| 2 | 25.5 | 9.24 | 235.62 |
| 3 | 24.5 | 6.32 | 154.84 |
| 4 | 25.6 | 6.39 | 163.584 |
| Comp. 1 | 34.4 | 3.25 | 118 |
| Comp. 2 | 40.9 | 3.29 | 134.5 |
| Comp. 3 | 29 | 3.6 | 104.4 |
| Comp. 4 | 23.9 | 3.8 | 90.82 |
| Comp. 5 | 25.3 | 1.75 | 44.3 |
| Comp. 6 | 19.5 | 1.9 | 37.05 |
| Comp. 7 | 41.5 | 3.2 | 132.7 |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An article fabricated from a plurality of polymeric tapes, wherein each of said polymeric tapes comprises a flattened multi-filament yarn, said yarn comprising a plurality of continuous polymeric filaments that are twisted together and bonded together; which tapes have an ultimate elongation (%) and which tapes have an ultimate tensile strength, wherein said ultimate tensile strength is at least 15 g/denier and wherein the value of the ultimate tensile strength (g/denier) of each tape multiplied by the ultimate elongation (%) of each tape is at least 150.

2. The article of claim 1 wherein the article is a non-woven laminate comprising a plurality of said polymeric tapes arranged unidirectionally in a side-by-side, substantially parallel, planar relation to each other and laminated together.

3. The article of claim 1 wherein the article comprises a plurality of non-woven laminates that are stacked together and consolidated, wherein adjacent laminates are oriented at different angles relative to a central longitudinal axis of the polymeric tapes of each laminate, and wherein each non-woven laminate comprises a plurality of polymeric tapes arranged unidirectionally in a side-by-side, substantially parallel, planar relation to each other and laminated together.

4. The article of claim 1 wherein said article comprises tapes formed from aramid filaments and tapes formed from polyethylene filaments.

5. The article of claim 1 wherein each of said polymeric tapes comprise polyethylene filaments and have an ultimate tensile strength of at least 20 g/denier.

6. The article of claim 1 wherein each of said polymeric tapes have an ultimate elongation of at least 5.0%.

7. The article of claim 1 wherein each of said polymeric tapes has an average cross-sectional aspect ratio of at least about 10:1.

8. The article of claim 1 wherein the article is a woven fabric.

9. The article claim 1 wherein each of said polymeric tapes comprises a plurality of continuous polymeric filaments that are twisted together with at least about 3 twists per inch of yarn length and less than about 11 twists per inch of yarn length.

10. An article fabricated from a plurality of polymeric tapes, wherein each of said polymeric tapes comprises a flattened multi-filament yarn, said yarn comprising a plurality of continuous polymeric filaments that are twisted together and bonded together; wherein at least one of said polymeric tapes has an ultimate elongation (y)(%) and an ultimate tensile strength (x)(g/denier) that are proportional to each other and conform to the relationship $y=-0.04x+b$, where $b=5$ or greater and x is 15 or greater.

11. The article of claim 10 wherein b is 5 to 15.

12. The article of claim 10 wherein x is at least 20 (g/denier) and b is 5 to 15.

13. The article of claim 10 wherein the article is a non-woven laminate comprising a plurality of said polymeric tapes arranged unidirectionally in a side-by-side, substantially parallel, planar relation to each other and laminated together.

14. The article of claim 10 wherein the article comprises a plurality of non-woven laminates that are stacked together and consolidated, wherein adjacent laminates are oriented at different angles relative to a central longitudinal axis of the polymeric tapes of each laminate, and wherein each non-woven laminate comprises a plurality of said polymeric tapes arranged unidirectionally in a side-by-side, substantially parallel, planar relation to each other and laminated together.

15. The article of claim 10 wherein the article is a woven fabric.

16. The article claim 10 wherein each of continuous polymeric filaments are twisted together with at least about 3 twists per inch of yarn length and less than about 11 twists per inch of yarn length.

17. The article of claim 10 wherein each of said polymeric tapes has an average cross-sectional aspect ratio of at least about 10:1.

* * * * *